United States Patent [19]
Ashida et al.

[11] 4,044,184
[45] Aug. 23, 1977

[54] CRYOGENIC INSULATING STRUCTURE

[75] Inventors: Kaneyoshi Ashida, Chofu; Masaaki Ohtani, Kawasaki; Makoto Ichii, Yokohama; Tatsuhiko Kobayashi, Kawasaki, all of Japan

[73] Assignee: Mitsubishi Chemical Industries Ltd., Tokyo, Japan

[21] Appl. No.: 612,853

[22] Filed: Sept. 12, 1975

Related U.S. Application Data

[63] Continuation of Ser. No. 483,715, June 27, 1974, abandoned.

[30] Foreign Application Priority Data

June 27, 1973 Japan .................................. 48-72633
Sept. 17, 1973 Japan ................................ 48-104763

[51] Int. Cl.² .............................................. B32B 3/26
[52] U.S. Cl. .................................... 428/113; 428/298; 428/303; 428/310; 428/313; 428/315; 428/320; 220/9 LG; 427/426
[58] Field of Search .................... 428/71, 35, 310, 313, 428/320, 315, 298, 105, 113, 212, 218, 303; 220/9 LG; 427/426, 244, 243

[56] References Cited

U.S. PATENT DOCUMENTS

| 3,091,551 | 5/1963 | Robertson | 427/426 |
|---|---|---|---|
| 3,172,072 | 3/1965 | Willy | 428/315 |
| 3,322,868 | 5/1967 | Kruse et al. | 428/295 |
| 3,345,245 | 10/1967 | Hanusa | 428/315 |
| 3,382,302 | 5/1968 | Marzocchi | 428/425 |
| 3,429,085 | 2/1969 | Stillman, Jr. | 428/315 |
| 3,565,746 | 2/1971 | Stevens | 428/315 |
| 3,586,649 | 6/1971 | Cobbledick | 428/315 |
| 3,655,086 | 4/1972 | Trenner | 220/9 LG |
| 3,749,594 | 7/1973 | Bibb | 427/244 |
| 3,753,848 | 8/1973 | Bennett | 428/322 |
| 3,895,159 | 7/1975 | Yoshimura | 220/9 LG |
| 3,896,961 | 7/1975 | Guilheim et al. | 220/9 LG |
| 3,916,060 | 10/1975 | Fish et al. | 427/426 |

Primary Examiner—William J. Van Balen
Attorney, Agent, or Firm—Oblon, Fisher, Spivak, McClelland & Maier

[57] ABSTRACT

A cryogenic heat insulating structure comprises: a wall coated with a plurality of superposed rigid foam layers each of the layers having a skin and each layer containing fibers oriented parallel to the wall.

7 Claims, 9 Drawing Figures

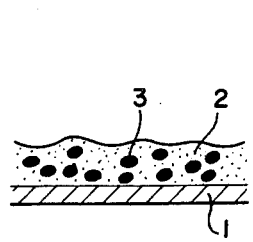
FIG. 1
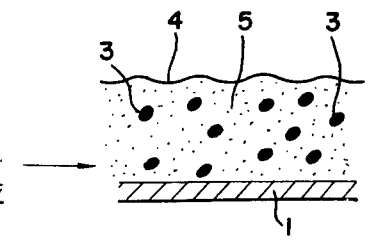
FIG. 2
FIG. 3
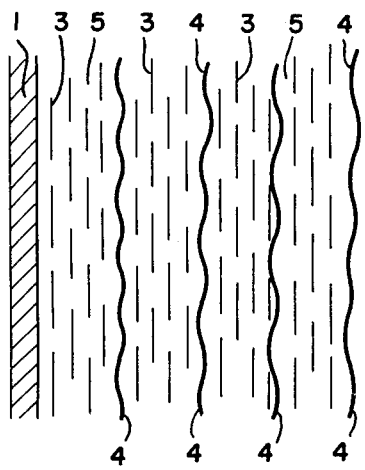
FIG. 5
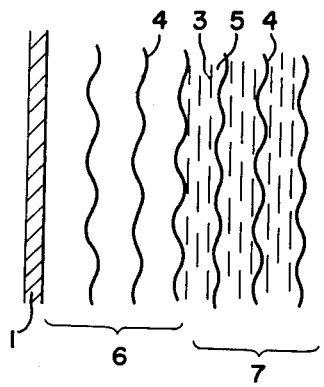
FIG. 4
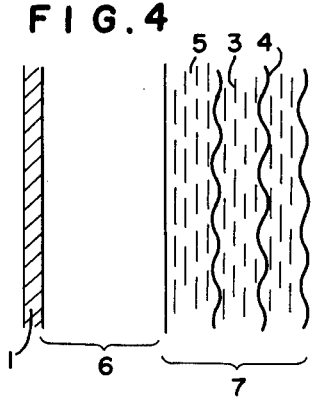
FIG. 6
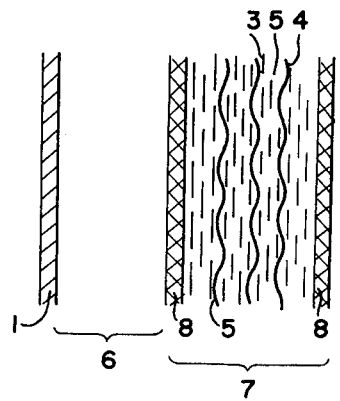

4,044,184

CRYOGENIC INSULATING STRUCTURE

This is a continuation of application Ser. No. 483,715 filed June 27, 1974, now abandoned.

BACKGROUND OF THE INVENTION

1. Field of the Invention:

The present invention relates to a cryogenic insulating structure for insulating tanks or pipes used for storing or transporting low boiling liquids, such as liquefied methane, liquefied natural gas and liquid nitrogen.

2. Description of the Prior Art

Various methods for insulating tanks containing low boiling liquids are known. From the viewpoint of heat insulating materials, the methods have been classified as solid-gas composite types (fiber, powder, foam) and vacuum types. In the vacuum type special structures for maintaining vacuum are required, so that the expense is high and practical applications are thus limited. In the solid-gas composite type, pearlite power has been used as the fiber-or powder-filled insulating layer.

Heat insulating layers have been used to insulate the outsides above ground LNG storage tanks. However, formation of void spaces caused by sedimentation of the powder has produced difficulties. Accordingly, the addition of supplemental amounts of the insulating powder and the maintenance of the insulation are difficult so that this type of insulation cannot be used practically for shipping tanks.

On the other hand, a foam product composed of a closed cell foam, such as a rigid polyurethane foam, possesses excellent heat insulation capabilities abilities and can be prepared at the site of tank construction. With this type of insulation the maintenance of the heat insulating layer is simpler. Accordingly, such heat insulating material is quite useful and has been used as outer heat insulating material on tanks and pipes for the transportation of liquefied natural gas. However, in connection with the outer heat insulating method, expensive metals which are not brittle at ultra low temperature, such as nickel-steel alloys, or aluminum must be used for construction of the tanks to contain the cryogenic liquid. Accordingly, the cost of tank construction is quite high, and therefore, an inner heat insulating method has been in demand. However, inner heat insulating layers must have the following characteristics:

a. No cracking in the heat insulating layer at cryogenic temperatures.

b. No permeation of the cryogenic-liquid into the heat insulating layer during practical use.

c. A protective layer for preventing leakage of the cryogenic-liquid by accidental breakage of the inner surface of the heat insulating layer.

d. The heat insulating layer should be durable to bending of the vessel caused by the charging or discharging of the cryogenic-liquid and durable to the impact weight caused by movement of the cryogenic-liquid during transportation.

A method of forming a heat insulation layer of rigid polyurethane foam on the inner surface of a cryogenic-liquid tank has been proposed wherein the lining is made by bonding rigid polyurethane foam reinforced with glass fiber or other fibers onto the inner surface of the tank. However, this method requires considerable labor for the preparation of the foam, the bonding operation and the testing of the bonded surface, whereby the cost of such a heat insulating method is prohibitively expensive and is not suitable for large tank construction. A need exists, therefore, for an inexpensive and facile method of insulating the inside of cryogenic liquid tanks.

SUMMARY OF THE INVENTION

Accordingly, one object of the present invention is to provide a method of forming a heat insulating structure on the inner surface of a cryogenic-liquid container such as a tank or pipe.

This object and other objects of the invention as well hereinafter become more readily understood can be attained by forming a random web of fiber on the surface of the wall to be heat insulated, spraying a foamable liquid onto the random web and impregnating the web with the foamable liquid, and foaming the foamable liquid. The operation is repeated to form a plurality of heat insulating layers reinforced with fiber.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein FIG. 1 is a partial sectional view of a layer of sprayed foamable liquid for producing a rigid foam;

FIG. 2 is a partial sectional view of the foam formed after foaming of the foamable liquid;

FIGS. 3-8 are respectively partial sectional views of various embodiments of the heat insulating layers.

DETAILED DESCRIPTION OF THE PREFERRED EMBODIMENTS

Figure 7:
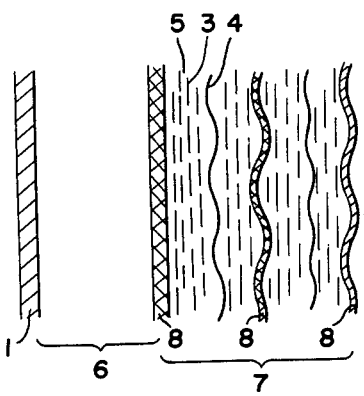
Figure 8:
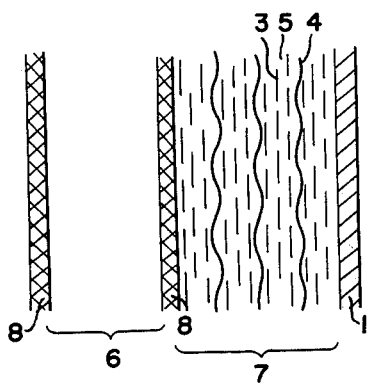

Suitable foamable liquids include foamable liquids for polyurethane foam, polyisocyanurate foam, epoxy foam, pyranyl foam, or the like which form foam by generating gas during polymerization. A foamable liquid having relatively low viscosity and high reaction velocity is preferable for spray-foaming. The strength of the foam is influenced by the type of polymer, the foam density, foaming method and chemical composition. The foam density is an important factor. Accordingly, the formation of a high density foam is necessary for durability against cryogenic liquid pressures on the inner surface heat insulation. Such foamable liquids are well known.

The rigid polyurethane foams may be prepared by reacting a polyol with a polyisocyanate in the presence of a blowing agent, a catalyst, a surfactant or the like. The details of the preparation are described in Saunders, I. H. and Frisch, K. C., Polyurethanes, Chemistry and Technology (Interscience Publishers); C. J. Benning, Plastic Foams (John Wiley and Sons); Vieweg, R and Hochtlen, A, Polyurethane (Carl Hamer Verlag Munchen); Polyurethane (Bridgestone Tire and Rubber Co., Maki); Polyurethane resin (Iwata; Nikkan Kogyo Shinbun); Plastic foam handbook (Maki and Kosakada; Nikkan Kogyo Shinbun), and elsewhere. A preferable formable liquid for producing a rigid polyurethane foam is one which provides a foam having a relatively low Young's modulus and relatively high dimensional stability.

Polyisocyanurate foams are a trimer of polyisocyanates prepared in the presence of a trimerization catalyst, a blowing agent, a surfactant, a modifier, or the like (or non-modifier). Processes and properties of these foams are disclosed in Ashida,K., Plastic material 13, No. 10, Pages 31-36, 1972); Ashida, K. and Frisch K. C., "Modified Isocyanurate Foams," J. Cellular Plastics May/June 1972, Pages 160-167; and ibid, July, August 1972, Page 194-200.

Pyranyl foams are prepared from a pyranyl monomer, a catalyst, a surfactant, a blowing agent, or the like. Processes and properties of the pyranyl foams are disclosed in Benning, Plastic Foam, Vol. 1, Page 567; Marrison, I. C., J. Cellular Plastics, August 1967, Page 364, and elsewhere.

Epoxy foams are prepared from a polyepoxide, a hardener, a blowing agent, a surfactant, or the like. Processes and properties of these foams are disclosed in Benning, Plastic Foams, Vol. 1, Page 503, and elsewhere. A foamable liquid for producing a rigid polyurethane foam is especially preferable.

In the preparation of the heat insulating layer, two or three liquid components are fed by a spray gun in a predetermined ratio to form the foamable liquid, which is then sprayed onto the random web. Two liquid component liquids are the most convenient for the foamable liquid preparation. Suitable spray guns include the inner mixing and outer mixing types. In the inner mixing type, the two or three liquid components are mixed and sprayed through one nozzle. In the outer mixing type, the two or three liquid components are sprayed from separated nozzles and combined in the air. The inner mixing type is preferable for obtaining a high quality foam.

Suitable spraying methods include air-spraying and airless-spraying. Air-spraying involves spraying the foamable liquid with compressed air. Airless spraying involves spraying without compressed air but with hydraulic pressure. In the present invention, both methods can be employed. However, an inner mixing-airless-spray system is especially preferable. Suitable fibers for the random web preparation include inorganic fibers, such as glass fibers, stainless steel fibers, aluminum fibers; and organic fibers, such as natural fibers, e.g. hemp or cotton, artificial fibers, e.g. rayon or acetate fiber, synthetic fibers, e.g. polyethyleneterephthalate, polyethylenenaphthalete, hydrolyzed ethylene-vinylacetate copolymer, or the like. The distribution of the fiber in the foam should be random, and should be oriented substantially parallel to the walls. (The direction of the fiber is substantially the same as the direction of contraction of the foam). Moreover, the fiber must be bonded to the foam and a fiber having a higher tensile strength and Young's modulus and lower elongation than those of the foam must be used. Accordingly, glass fiber or hemp, especially glass fiber, is especially preferable for meeting the requirements. Suitable forms of the fibrous materials include roving, various staple fibers, split yarn, monofilament, multifilament, or the like. Roving is especially preferable. The length of the fibrous materials depends upon the type of fiber and shape. The length is preferably selected to form a random web and to prevent voids formed by the bulk of fiber in the composite of the fiber and the foam. Shorter fibers do not cause voids formed by the bulk of the fiber, but sufficient length is required to prevent cracking of the heat insulating layer. On the other hand, too long fibers or too high a fiber content will cause an unsatisfactory blending of the foamable liquid with the fiber, whereby the bulk of the fiber will form voids easily. Accordingly, a preferable length is about 10-100 mm, preferably 20-80 mm, most preferably 25-70 mm.

The fiber content depends upon the density, the strength of the fiber, and other factors. When glass fiber roving is used, the fiber content is usually 1-10%, preferably 2-10%, most preferably 2-7% of the foam.

Suitable feeders for the fiber include a convenient chopper used to spray glass fiber-reinforced plastics and a commercial short fiber spray gun having a glass fiber roving cutter and an air-nozzle. The fiber should be distributed uniformly in the foam. Furthermore, as stated above, the fiber should be oriented parallel to the wall to prevent cracking in the heat insulating layer. In order to so orient the fiber, as shown in FIG. 1, the fiber 3 is fed via an air-stream onto wall 1 to form a rough random web (separated fiber), and the foamable liquid 2 is sprayed on the web. Pushing the web with air results in foaming. FIG. 2 is a sectional view of the foam wherein reference numeral 1 designates a wall for heat insulation; 5 designates a rigid foam; 3 designates a fiber; and 4 designates a skin layer of the foam. The fiber in the heat insulating layer is oriented parallel to the wall. When a conventional heat insulating layer is exposed to cryogenic temperatures, perpendicular cracking results. This is because contraction of the foam in the heat insulating layer occurs in a direction parallel to the wall. In accordance with the present invention, the fibers are oriented substantially parallel to the wall and the fibers are firmly bonded to the foam, whereby the linear expansion coefficient of the foam in the parallel direction is low and the fiber oriented parallel to the wall prevents local stress. Accordingly, no cracking even at cryogenic temperatures results. Table 1 shows the physical properties of heat insulating layers made of a foam containing fibers oriented parallel to the wall prepared by feeding the fiber and spraying a foamable liquid, according to the present invention, and a heat insulating layer made of a foam containing no fibers, prepared by spraying a foamable liquid to produce a rigid polyurethane foam.

TABLE 1

|  | Foam (no fiber) | Foam containing orientated fiber | |
|---|---|---|---|
|  |  | No. 1 (a) | No. 2 (b) |
| average density kg/m$^3$ | 85 | 87 | 86 |
| glass fiber content % | 0 | 6.3 | 7.3 |
| Young's modulus (20° C) (kg/cm$^2$) ($\parallel$) (c) | 159 | 285 | 335 |
| ($\perp$) (d) | 123 | 255 | 335 |
| Young's modulus (−196° C) (kg/cm$^2$) ($\parallel$) | 307 | 558 | 568 |
| ($\perp$) | 253 | 426 | 508 |
| linear expansion coefficient × 10$^{-5}$/° C ($\parallel$) | 4.86 | 5.83 | 6.32 |
| ($\perp$) | 5.77 | 3.35 | 2.78 |
| Tensile strength (20° C) (kg/cm$^2$) ($\parallel$) | 8.08 | 9.11 | 7.74 |
| ($\perp$) | 7.49 | 8.28 | 9.10 |
| Tensile strength (−196° C) ($\parallel$) | 10.05 | 10.60 | 10.41 |
| ($\perp$) | 9.38 | 8.82 | 9.20 |

(a) fiber length 30 mm
(b) fiber length 60 mm
(c) strength parallel to foaming
(d) strength perpendicular to foaming In the process of the present invention, a plurality of composite layers are formed by repeating the feeding of fiber and the spraying of foamable liquid. As the plurality of composite layers are formed, the skin layer from the previous layer prevents premeation of gas and liquid. Accordingly, even if the top layer of the inner heat insulating layer of the tank becomes broken, gas or liquid will not permeate into the second or following layers. The thickness of one layer formed by one spraying operation is preferably about 5-25 mm, most preferably about 10-20 mm.

The heat insulating layer formed according to the present invention is suitable for inner heat insulation of storage or transportation tanks for liquefied natural gas, liquid nitrogen, liquid ethylene, or the like. The insulating layer is also applicable for outer heat insulation. The surface of the heat insulating layer in contact with the cryogenic-liquid is preferably protected with an overcoating or a protective layer of metal or plastic plate bonded onto the heat insulating layer. The heat insulating layer formed by repeating the feeding of fiber and the spraying of foamable liquid, has the advantage of not cracking at cryogenic temperature, but is relatively expensive to prepare compared with the heat insulating layer formed by foamable liquid without fiber. Accordingly, the heat insulating layer containing fiber is preferably combined with the heat insulating layer containing no fiber. A fiber-containing heat insulating layer formed on the lower temperature side of the tank and a heat insulating layer containing no fiber formed on the higher temperature sie is a preferable combination. The foam layer containing no fiber formed on the higher temperature side may be formed from the above-mentioned foams as well as from polyvinylchloride foam, polystyrene foam, phenol resin foam, A B S resin foam, polyamide foam and other foams. Suitable states of the foam include closed cell foam, open cell foam or mixtures thereof. When a thermoplastic resin foam is used, the molded foam must be bonded with a binder in the insulation construction. Accordingly, a foamable liquid which forms a bonded layer as stated above is preferable from an economic viewpoint. Polyvinylchloride foam is the preferred thermoplastic resin foam. Polyurethane foam is the preferred thermosetting resin foam, and a rigid polyurethane foam having an apparent density of less than 200 kg/cm$^3$ is especially preferable.

In the formation of an inner heat insulating layer for a container for cryogenic liquids by combining a heat insulating layer of foam containing fiber and a heat insulating layer of foam containing no fiber, as shown in FIG. 4 and FIG. 5, the foam is bonded to the inner wall 1 of the container with a binder, or a foamable liquid is sprayed and foamed. Single or plural heat insulating layers 6 in the higher temperature side are formed. The heat insulating layer 7 of the invention, containing fiber, is formed on the layer 6. In the formation of the heat insulating layer on the lower temperature side, the feeding of fiber and the spraying of foamable liquid is preferably repeated to form a plurality of foam layers. Each skin layer 4 prevents permeation of gas or liquid. Accordingly, even if the top layer is broken, the gas or liquid will not permeate into the second or following layers. As shown in FIGS. 6 and 7, a desirable barrier 8 may be placed at the boundary between layer 6 and layer 7, at the surface contacted with the cryogenic liquid or at any position in the layer 7, if preferable. If a crack is formed in the inner insulating layer, the permeation of the cryogenic liquid will be prevented by the barrier 8, and the liquid will not reach layer 6, whereby the brittleness of the layer 6 caused by cooling will be prevented, the stability of the heat insulating wall will be improved and the mechanical loss of the layer 6 prevented.

A suitable barrier includes any non-foam material which will not crack when contacted with cryogenic liquid and which will prevent permeation of the cryogenic liquid. Suitable barriers include plywood, aluminum plate, nickel-steel allow plate and glass fiber reinforced plastic plate, such as a composite of glass fiber and epoxy resin, urethane resin or polyester resin.

In the case of outer heat insulation, when the barrier is placed on the outer surface of the layer 6, permeation of moisture will be prevented, and the decrease in efficiency of heat insulation will be prevented. The barrier may be formed by bonding with a binder. Another method of bonding involves bonding a polyurethane foam spacer onto the wall, holding the barrier and pouring the polyurethane foamable liquid into the void space to bond the barrier and form layer 6 simultaneously. When the heat insulating layer is formed by spraying the foamable liquid, the surface of the foam is slightly concave or convex. Accordingly, the surface is shaved to form a smooth surface for bonding the barrier. When the barrier is bonded without shaving, a rough glass cloth is held on the surface of foam with pins, and epoxy resin, unsaturated polyester resin or urethane resin is impregnated onto the cloth to form a barrier of fiber reinforced resin composite.

Figure 9:
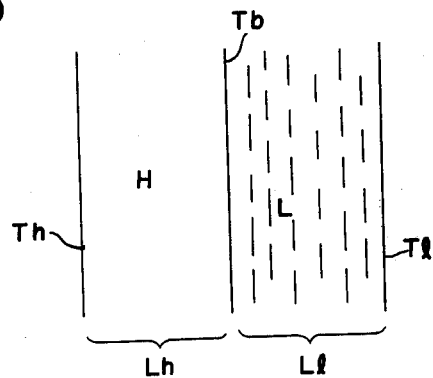

When the two foam heat insulating layers with and without fiber are combined, care must be exercised to prevent cracking of the layer 6 of the foam containing no fiber when contacted with the cryogenic-liquid. The layer of foam containing no fiber will usually crack by cooling to a temperature less than $-100°$ C, though this depends upon the type and density of the resin. Accordingly, when liquid having a temperature less than $-100°$ C is contained in the tank, the thickness of layer 6 or layer 7 is determined so that a temperature higher than $-100°$ C will exist in the boundary between layer 6 and layer 7. In FIG. 9, H designates the higher temperature layer, L designates the lower temperature layer, Th designates atmospheric temperature, T$l$ designates the temperature of cryogenic-liquid. Tb designtes the temperature of the boundary between both layers. L$h$ designates the thickness of the higher temperature layer, and L$l$ designates the thickness of the lower temperature layer. L$h$ and L$l$ are determined so that Tb is higher than $-100°$ C. L$h$ and L$l$ are decided upon by considering the type, density and heat conductivity of the foams H and L, and Th and T$l$. Various combinations of L$h$ and L$l$ can produce a temperature Tb higher than $-100°$ C. If L$h$ and L$l$ are too thick, the process becomes uneconomical. On the other hand, the thickness should be sufficient to provide durability against the impact weight caused by movement of the liquid during transportation, and to withstand bending of the container during charging and discharging of the contents. Accordingly, from an economic and safety viewpoint, the thickness L$h$ and L$l$ should be set to give Tb of $-10° - \sim -100°$ C, and at least $-80° - \sim -100°$ C. As an example, when a rigid fluorocarbon blown polyurethane foam having an apparent density of about 0.1 is used as the higher temperature layer for a container for liquefied natural gas, the thickness L$l$ is 5-10 cm, preferably 7-8 cm.

The heat insulating structure of the present invention is formed in one piece and is highly reliable and safe compared with the conventional heat insulating forms, and can be formed simply and economically without a bonding operation. The heat insulating layer of the present invention can be used for both inner surface heat insulation and outer surface heat insulation. Since the fiber is oriented to prevent local stress caused by contraction and expansion of the heat insulating layer, the cracking of the heat insulating layer can be prevented.

In inner surface heat insulation, safety against permeation of the cryogenic liquid and against damage of the surface layer are quite high. In the spraying operation, commercially automatic spraying apparatus for foamable liquids or a glass fiber may be employed for automatic processing. An excellent heat insulating layer can be easily formed. Accordingly, the industrial value of the invention is remarkably high. In accordance with the heat insulating layer of the present invention, a container of cryogenic liquid, such as liquid nitrogen, liquid methane, liquid hydrogen, or the like can be effectively insulated. The body of the container, e.g. a tank, can be economically made of mild steel, instead of expensive materials such as 9% nickel-steel or aluminum plate. The cost of the container can be substantially decreased. The sizes of ships can be substantially decreased if this invention is applied to LNG tanker ships, because of the high insulating coefficient per volume. The cost of the ship can thus be advantageously decreased.

In accordance with our invention, when the cryogenic insulating structure is disposed on an inner wall, the premeation of the cryogenic-liquid can be completely prevented by the skin layers. When the cryogenic insulating structure is disposed on an outer wall, the permeation of air, moisture, or the like can be completely prevented by the skin layers. Since a plurality of skin layers are formed on each 5-25 mm thick foam layer the permeation can be prevented even though one or two skin layers is accidentally damaged. A suitable skin layer is 0.2-0.6 mm thick. With a density gradient between the maximum density of the resin and the density of the foam layer. The skin layer possesses a surface membrane containing no foam.

Having generally described the invention, a more complete understanding can be obtained by reference to certain specific examples, which are included for purposes of illustration only and are not intended to be limiting unless otherwise specified.

The materials, the apparatus and the conditions of operation are as follows:

APPARATUS

Spray foaming apparatus with Model D gun (manufactured by Gusmer Corp.), airless spray inner mixing type.

TEMPERATURE OF FOAMABLE LIQUID

45° C

SPRAY RATE OF THE FOAMABLE LIQUID 6 lbs/min.

FOAM CHARACTERISTICS cream time — 2-3 sec.
rise time — 10 sec.

TYPE OF FOAMABLE LIQUID

A. Polyurethane spray foamable liquid comprising polyisocyanate, polyether polyol, trichloromonofluoromethane, amine catalyst, silicone surfactant.

B. Epoxy resin spray foamable liquid, Epon Spray 175 (manufactured by Reliance Universal Inc.)

GLASS FIBER (manufactured by Asahi Glass) No. R 2310-863-D Glassron-roving

FIBER CUTTER

Spray up chopper B-210 (manufactured by Glasscraft Co.)

THERMAL SHOCK TEST

A foam having a length and width of 60 cm and thickness of 10 cm was bonded with an epoxy resin binder in a wooden yoke having an inner length and width of 60 cm and height of 15 cm to form a box having a foam bottom. Liquid nitrogen was poured into the box for about 2 hours to test for cracking of the foam.

EXAMPLE 1

Inner heat insulating layer prepared by using glass fiber and polyurethane foamable liquid (A)

a. An iron plate having a thickness of 10 mm and width and height of 1 m was kept vertical. A foamable liquid (A) was sprayed at 44° C (temperature at the outlet of gun) in a 16° C room. The glass fiber was fed through a chopper just before spraying the foamable liquid into the system and the chopper and the gun were kept parallel, whereby the foamable liquid was sprayed onto the glass fiber web just after spraying the glass fiber with air on the iron plate. The position of the knife and the rotation of the chopper were adjusted so as to cut the glass fiber roving to a length of 10 mm and to give a glass content of 3%. The thickness of one layer prepared by one spraying cycle was 10-15 mm and seven layers were formd. The average density of the foam was 85 kg/m$^3$. According to the thermal shock test of the resulting foam layer, no cracking was found.

b. The process of (a) was repeated except that glass fiber having length of 60 mm and glass fiber content of 5% was used to prepare the foam layer. According to the thermal shock test, no cracking was found.

EXAMPLE 2

Outer heat insulating layer prepred by using glass fiber and polyurethane foamable liquid: The process of Example 1 was repeated except that the material was sprayed on the outer surface of a spherical tank made of 9% nickel-steel having diameter of 1 m and thickness of 10 mm, at an atmospheric temperature of 23° C, using a glass fiber having a length of 30 mm and glass fiber content of 7%. The glass fiber and the foamable liquid were repeatedly sprayed to prepare a foam having a total thickness of 200 mm. The surface of the foam was coated with a butyl rubber paint, Chem-elast 5500 (manufactured by Plas-Chem. Corporation) to prevent the permeation of moisture. About 200l of liquid nitrogen was gradually added to the spherical tank for about 6 hours. The tank was kept so as to allow free evaporation of liquid nitrogen. After removing all the nitrogen, that sample was kept at room temperature for one day and the foam was broken to observe possible cracking. No cracking was found.

EXAMPLE 3

An inner heat insulating layer was prepared by using a glass fiber and an epoxy resin foamable liquid (B). The experiment of example 1 (a) was repeated except that foamable liquid (B) was used. The average density of the foam was 34 kg/m³. According to the thermal shock test, no crackingwas found.

EXAMPLE 4

Heat insulating layers were prepared using various fibers. Several rigid polyurethane foam layers containing various fibers having a length of about 50 mm, as shown in Table 2, were prepared in accordance with the process of the invention. According to the thermal shock test of each foam layer, the polyurethane foam layer containing the oriented fiber showed no cracking. However, the polyurethane foam layer containing no fiber cracked.

TABLE 2

| Fiber | Shape | Denier |
| --- | --- | --- |
| polyethylene-terephthalate | monofilament | 220[d] |
| " | multifilament | 210 d/24[F] |
| nylon | multifilament | 210 d/24[F] |
| polyether-ester | multifilament | 75 d/24[F] |
| polyvinylalchol | multifilament | 110 d/24[F] |
| hemp | thread | 20[s] |

[d]denier
[F]filament number
[s]count

EXAMPLE 5

A composite inner heat insulating layer of a rigid polyurethane foam containing oriented glass fiber and a polyurethane foam containing no glass fiber:

a. The spraying of the foamable liquid was repeated on an iron plate 1000 × 2000 × 5 mm with the Gusmer spray foaming apparatus, to form a layer 10–20 mm thick in one cycle, and to form total layers about 100 mm thick with an average density of 85 kg/m³, which served as the layer on the higher temperature side. A chopper (Glasscraft Corp. Type R-1150-863 D) was kept parallel to the spray gun. Glass fiber roving having a length of 20 mm was fed into the chopper and simultaneously the polyurethane foamable liquid was sprayed on the foam layer. The feeding of the fiber and the spraying of the foamable liquid were repeated to form a layer about 10–20 mm thick with glass fiber content of about 4% in one cycle, and to form total layers about 100 mm thick, which serve as the layer on the lower temperature side. The gun and the chopper were operated so as to spray the foamable liquid on the glass fiber while at the time feeding the glass fiber on the foam with air to achieve a spray-foaming process. Cryogenic liquid was added to a container having the composite heat insulating layer to investigate the formation of cracking by the thermal shock test.

THERMAL SHOCK TEST METHOD

The composite foam having a length and width of 60 cm and thickness of about 20 cm was bonded with an epoxy resin binder in a wooden yoke having an inner length and width of 60 cm and a height of 25 cm to form a box with a bottom made of the composite foam (the oriented glass fiber-containing layer was inside). Liquid nitrogen was poured into the box for about 2 hours to test for cracking of the foam (the crack forms with sound and provides a visible gap). According to the thermal shock test, no cracking was found in the composite heat insulating layer, which is thus durable to the thermal shock caused by liquid nitrogen. A glass cloth (Glassron cloth MG-130 Asahi Fiber Glass Co.) was held onto the surface of the oriented glass fiber-containing layer with pins. A polyurethane sealant was coated onto the glass cloth and was cured to form a barrier layer. According to the thermal shock test, no cracking was found. The container was filled with liquid nitrogen and kept supercooled for 24 hours by adding more liquid nitrogen. The temperature of the boundary between the two layers (the oriented glass fiber-containing layer and the non-glass fiber layer) was measured by a thermocouple and was confirmed to be at equilibrium at −65° C.

b. The process of Example 5 (a) was repeated except that a urethane modified isocyanurate foamable liquid was sprayed to form a layer containing no glass fiber with apparent foam density of 80 kg/m³ and then spraying a polyurethane foamable liquid to form the oriented glass fiber-containing layer with an apparent foam density of 80 kg/m³. A similar composite foam was obtained. Liquid nitrogen was poured into the box with a bottom made of the resulting composite foam, for the thermal shock test. No cracking was found. The container was filled with liquid nitrogen and kept for 30 hours at −196° C. The temperature of the boundary between the two layers at equilibrium was −70° C.

EXAMPLE 6

Composite outer heat insulating layer of rigid polyurethane foam containing oriented glass fiber and a barrier and a polyurethane foam containing no glass fiber: In accordance with the process of Example 5 (a), the feeding of glass fiber and the spraying of the foamable liquid (apparent foam density of 48 kg/m³) were repeated on an outer surface of a spherical tank made of 9% nickel steel having a diameter of 1 m (for storage of liquid nitrogen) to form an oriented glass fiber containing foam about 8 cm thick. The surface of the foam was covered with glass cloth (Glassron cloth MG-130) and two liquid urethane elastomers were coated, impregnated and cured on the cloth. The operation was repeated to form a barrier composed of two glass cloths. The spraying of the foamable liquid was repeated on the barrier to form a rigid foam layer of about 12 cm thick (containing no glass fiber). The total thickness of the heat insulating layer was 20 cm. A butyl rubber paint (Vapalon: Esso-Standard Oil Co.) was coated onto the surface of the foam as a moisture proofing barrier in an average thickness of 0.5–0.75 mm. Liquid nitrogen was gradually added to the spherical tank to decrease the temperature of −100° C over about 10 hours. The temperature was further decreased to about −190° C for about 10 hours, and then the liquid nitrogen in the tank was brought to a level of 70%, and the vaporized nitrogen gas was measured by a gas flow meter. This condition was maintained for 2 weeks by adding liquid nitrogen. During the test, no cracking sound was heard, which confirmed the practical value of the heat insulating structure. The temperature of boundary between the two layers in the heat insulating structure was −82° C.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A cryogenic heat insulating structure, which comprises: a wall on whose surfce is coated a plurality of superposed rigid resin foam layers each of which has a surface skin layer of a thickness of from 0.2 to 0.6 mm having a surface membrane free of rigid foam which skin layers possess a density gradient between the maximum density of the resin and the density of the foam layer, wherein each foam layer is formed by simultaneously spraying a fiber and a foamable resin, and contains fibers oriented parallel to said wall.

2. The insulating structure of claim 1, wherein said fibers are glass fibers having a length of 10–100 mm.

3. The insulating structure of claim 1, wherein each foam layer contains from 1–10 weight percent of said fibers.

4. A cryogenic heat insulating structure which comprises:

a wall on whose inner surface is coated at least one fiberless rigid resin foam layer disposed between said wall and a plurality of superposed rigid resin foam layers, each of said layers possessing a surface skin layer of a thickness of from 0.2 to 0.6 mm having a surface membrane free of rigid foam which skin layers possess a density gradient between the maximum density of the resin and the density of the foam layer, wherein each superposed foam layer is formed by simultaneously spraying a fiber and a foamable resin and contains fibers oriented parallel to said wall.

5. The insulating structure of claim 4, wherein a barrier is disposed between said fiber-containing foam layers and said fiberless, rigid foam layer.

6. A cryogenic heating insulating structure which comprises:

a wall on whose outer surface is coated a plurality of superposed rigid fiber containing resin foams layers and then at least one fiberless rigid resin foam layer, each of which layers has a surface skin layer of a thickness from 0.2 to 0.6 mm having a surface membrane free of rigid foam which skin layers possess a density gradient between the maximum density of the resin and the density of the foam layer, wherein each superposed foam layer is formed by simultaneously spraying a fiber and a foamable resin, and contains fibers oriented parallel to said wall.

7. The insulating structure of claim 6, wherein a barrier is disposed between said fiber-containing foam layers and said fiberless, rigid foam layer.

* * * * *